(12) United States Patent
Newman et al.

(10) Patent No.: US 11,210,672 B2
(45) Date of Patent: Dec. 28, 2021

(54) IDENTITY GRAY LIST

(71) Applicant: Capital One Services, LLC, McLean, VA (US)

(72) Inventors: Kaitlin J. Newman, Washington, DC (US); Michael Mossoba, Arlington, VA (US); Abdelkader M'Hamed Benkreira, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 123 days.

(21) Appl. No.: 16/683,740

(22) Filed: Nov. 14, 2019

(65) Prior Publication Data

US 2020/0167790 A1 May 28, 2020

Related U.S. Application Data

(63) Continuation of application No. 16/202,948, filed on Nov. 28, 2018, now Pat. No. 10,521,796.

(51) Int. Cl.
| | |
|---|---|
| *G06Q 20/40* | (2012.01) |
| *G06Q 20/38* | (2012.01) |
| *G06F 9/54* | (2006.01) |
| *H04L 29/06* | (2006.01) |
| *H04W 4/021* | (2018.01) |

(52) U.S. Cl.
CPC ......... *G06Q 20/4016* (2013.01); *G06F 9/542* (2013.01); *G06Q 20/382* (2013.01); *H04L 63/102* (2013.01); *H04L 63/107* (2013.01); *H04W 4/021* (2013.01)

(58) Field of Classification Search
CPC .. G06Q 20/4016; G06Q 20/382; G06F 9/542; H04L 63/102; H04L 63/107; H04W 4/021
USPC .......................................................... 705/44
See application file for complete search history.

(56) References Cited

U.S. PATENT DOCUMENTS

| | | | |
|---|---|---|---|
| 9,275,234 B2 * | 3/2016 | McGloin | G06F 21/88 |
| 9,313,211 B1 * | 4/2016 | Lototskiy | G06F 21/554 |
| 9,727,747 B1 * | 8/2017 | Kim | H04W 12/08 |

(Continued)

OTHER PUBLICATIONS

Szczytowski P. (2015) Geo-fencing Based Disaster Management Service. In: Koch F., Meneguzzi F., Lakkaraju K. (eds) Agent Technology for Intelligent Mobile Services and Smart Societies. AVSA 2014, CARE 2014. Communications in Computer and Information Science, vol. 498. Springer, Berlin, Heidelberg (Year: 2014).*

(Continued)

*Primary Examiner* — Sara C Hamilton
(74) *Attorney, Agent, or Firm* — DLA Piper LLP US

(57) ABSTRACT

Account functionality may be modified in response to an event. A processor may determine that a status of at least one of a user, a device associated with the user, and data associated with the user is potentially insecure due to the event. The processor may identify an account of the user. The account may provide access to electronic financial transaction functionality. In response to the determining that the status of at least one of the user, the device associated with the user, and the data associated with the user is potentially insecure, the processor may modify a condition affecting the access to the electronic financial transaction functionality.

16 Claims, 5 Drawing Sheets

(56) References Cited

U.S. PATENT DOCUMENTS

| | | | |
|---|---|---|---|
| 10,136,296 B1* | 11/2018 | Dames | H04L 67/12 |
| 2002/0125886 A1* | 9/2002 | Bates | H04L 63/104 |
| | | | 324/307 |
| 2010/0100972 A1* | 4/2010 | Lemieux | H04W 12/02 |
| | | | 726/34 |
| 2011/0191862 A1* | 8/2011 | Mandava | H04L 63/107 |
| | | | 726/28 |
| 2013/0091042 A1 | 4/2013 | Shah et al. | |
| 2013/0337789 A1 | 12/2013 | Johnson | |
| 2015/0121515 A1* | 4/2015 | Aratsu | H04M 1/72457 |
| | | | 726/19 |
| 2015/0296074 A1* | 10/2015 | Shah | H04W 64/00 |
| | | | 455/418 |
| 2015/0350410 A1 | 12/2015 | Weiss | |
| 2017/0148241 A1 | 5/2017 | Kerning | |
| 2018/0007558 A1* | 1/2018 | Maragoudakis | H04L 63/0853 |
| 2018/0018470 A1* | 1/2018 | Aggarwal | G06F 21/604 |
| 2018/0032997 A1* | 2/2018 | Gordon | G06Q 30/0269 |
| 2018/0160260 A1 | 6/2018 | Meganathan | |
| 2018/0198755 A1 | 7/2018 | Domangue | |
| 2018/0270608 A1* | 9/2018 | Thoresen | H04W 4/029 |
| 2018/0270612 A1* | 9/2018 | Thoresen | G01S 5/14 |
| 2018/0286161 A1* | 10/2018 | Yorifuji | G07C 9/28 |
| 2019/0095882 A1 | 3/2019 | Parker | |
| 2019/0010873 A1 | 4/2019 | Xu | |
| 2019/0108404 A1 | 4/2019 | Xu | |
| 2019/0108405 A1 | 4/2019 | Xu | |
| 2019/0347431 A1* | 11/2019 | Nair | H04L 63/107 |
| 2019/0379657 A1* | 12/2019 | Gosalia | H04W 12/06 |

OTHER PUBLICATIONS

Szczytowski P. (2015) Geo-fencing Based Disaster Management Service. In: Koch F., Meneguzzi F., Lakkaraju K. (eds) Agent Technology for Intelligent Mobile Services and Smart Societies. AVSA 2014, CARE 2014. Communications in Computer and Information Science, vol. 498. Springer, Berlin, Heidelberg (Year: 2015).
Examiner's Report in CA Application No. 3,062,493, dated Feb. 19, 2021, 5 pages.

* cited by examiner

IDENTITY GRAY LIST

CROSS-REFERENCE TO RELATED APPLICATION INFORMATION

This is a continuation of U.S. patent application Ser. No. 16/202,948 filed Nov. 28, 2018, which the entirety is incorporated herein by reference.

BACKGROUND

Identity theft and/or theft of user account information often occurs during times when the user's ordinary life is disrupted. For example, a natural disaster in an area where a user lives or is visiting may make the user vulnerable to identity and/or account theft for a variety of reasons. Backend systems may lose track of the user's whereabouts, the user may have their normal financial transactions and/or other daily activity disrupted, the user may be forced to leave the area unexpectedly, the user may be injured or otherwise directly harmed, etc. Any of these issues may make it difficult for a backend system (e.g., transaction system) to determine whether user transactions or actions are legitimate and/or to contact the user for identity protection reasons.

SUMMARY OF THE DISCLOSURE

In some embodiments, a method of modifying account functionality in response to an event may include determining, by a processor, an area affected by the event. The method may include identifying, by the processor, an account of a user within the area. The account may provide access to electronic financial transaction functionality. The method may include determining, by the processor, that a status of the user is potentially insecure due to the event. The method may include, in response to the determining that the status of the user is potentially insecure, modifying, by the processor, a condition affecting the access to the electronic financial transaction functionality.

In some embodiments, the determining of the area may include configuring a geofence defining the area.

In some embodiments, the determining that the status of the user is potentially insecure may include sending a message to a device associated with the user and failing to detect a response from the device before a first time from the sending.

In some embodiments, the determining that the status of the user is potentially insecure may include sending a message to a device associated with the user and receiving a response from the device indicating that the user is insecure.

In some embodiments, the method may include locking access to the electronic financial transaction functionality after the identifying of the account and before the determining that the status of the user is potentially insecure.

In some embodiments, the modifying of the condition may include at least one of the following elements: restricting at least one of a plurality of activities provided by the electronic financial transaction functionality; increasing a threat level associated with at least one transaction performed by the electronic financial transaction functionality; and issuing a replacement physical card used to provide the access to the electronic financial transaction functionality.

In some embodiments, the method may include determining that the status of the user is no longer potentially insecure. The method may include restoring the condition to a status prior to the modifying in response to the determining that the status of the user is no longer potentially insecure.

In some embodiments, a method of modifying account functionality in response to an event may include determining, by a processor, that a status of a user is potentially insecure due to the event. The method may include identifying, by the processor, an account of the user. The account may provide access to electronic financial transaction functionality. The method may include, in response to the determining that the status of the user is potentially insecure, modifying, by the processor, a condition affecting the access to the electronic financial transaction functionality.

In some embodiments, the determining that the status of the user is potentially insecure may include sending a message to a device associated with the user and failing to detect a response from the device before a first time from the sending.

In some embodiments, the determining that the status of the user is potentially insecure may include sending a message to a device associated with the user and receiving a response from the device indicating that the user is insecure.

In some embodiments, the method may include locking access to the electronic financial transaction functionality after the identifying of the account and before the determining that the status of the user is potentially insecure.

In some embodiments, the modifying of the condition may include at least one of the following elements: restricting at least one of a plurality of activities provided by the electronic financial transaction functionality; increasing a threat level associated with at least one transaction performed by the electronic financial transaction functionality; and issuing a replacement physical card used to provide the access to the electronic financial transaction functionality.

In some embodiments, the method may include determining that the status of the user is no longer potentially insecure. In some embodiments, the method may include restoring the condition to a status prior to the modifying in response to the determining that the status of the user is no longer potentially insecure.

In some embodiments, a system may be configured to modify account functionality in response to an event. The system may include a transceiver configured to communicate with a device associated with a user. The system may include a processor in communication with the transceiver. The system may include a non-transitory memory in communication with the processor and configured to store instructions that, when executed by the processor, cause the processor to perform processing. The processing may include determining that a status of the user is potentially insecure due to the event based on at least one message exchanged between the transceiver and the device. The processing may include identifying an account of the user. The account may provide access to electronic financial transaction functionality. The processing may include, in response to the determining that the status of the user is potentially insecure, modifying a condition affecting the access to the electronic financial transaction functionality.

In some embodiments, the processing may include determining an area affected by the event and identifying the user based on information placing the user within the area.

In some embodiments, the determining of the area may include configuring a geofence defining the area.

In some embodiments, the at least one message may include at least one of a message sent to the device to which a response is not received before a first time from the sending and a response from the device indicating that the user is insecure.

In some embodiments, the processing may include locking access to the electronic financial transaction functionality after the identifying of the account and before the determining that the status of the user is potentially insecure.

In some embodiments, the modifying of the condition may include at least one of the following elements: restricting at least one of a plurality of activities provided by the electronic financial transaction functionality; increasing a threat level associated with at least one transaction performed by the electronic financial transaction functionality; and issuing a replacement physical card used to provide the access to the electronic financial transaction functionality.

In some embodiments, the processing may include determining that the status of the user is no longer potentially insecure. The processing may include restoring the condition to a status prior to the modifying in response to the determining that the status of the user is no longer potentially insecure.

DETAILED DESCRIPTION OF SEVERAL EMBODIMENTS

Embodiments disclosed herein may ensure and/or improve the security of user data during times when the data may be especially vulnerable, such as during natural disasters or other unforeseen events. For example, some embodiments may identify at least one user that may be affected by an event and attempt to determine the status of the user. Based on the determination, user data may be locked in some cases. In other cases, one or more other account settings for the user may be adjusted. For example, a scrutiny level at which user data may be monitored may be adjusted to detect potential misuse or fraud involving the user data. Over time, and/or as more information about the user's status is gathered, data lockdowns and/or account modifications may be rolled back and/or adjusted. Accordingly, embodiments disclosed herein may improve data security in response to events that may otherwise degrade data security, as well as provide information and/or status notification to users themselves.

In some embodiments, user data protected by the disclosed embodiments may be highly sensitive data. For example, the loss of a social security card may put a user at risk of identity theft, so social security data may be given high protection (e.g., locking access thereto, notifying credit bureaus of possible compromise, etc.). Disclosed embodiments may provide different levels of concern around data not being safe. For example, mail that is lost with a user's address on it may be of lower concern than a lost passport, driver's license, tax return, social security card, etc. As described in detail below, disclosed embodiments may automatically take measures to secure data and/or related account functionality.

Figure 1:
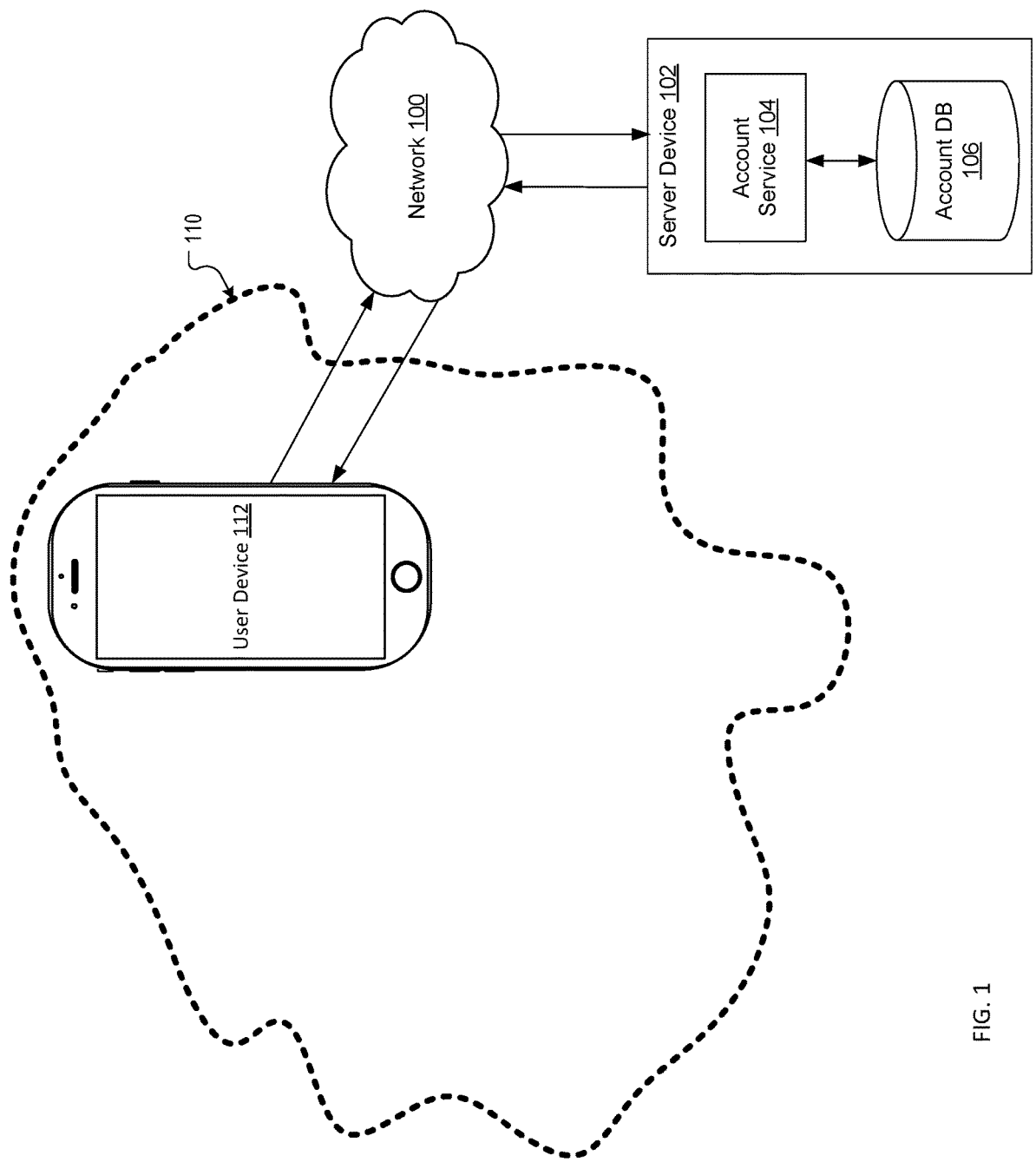
FIG. 1 shows a network according to an embodiment of the present disclosure.

FIG. 1 shows a network 100 according to an embodiment of the present disclosure. Network 100 may include the Internet and/or other public or private networks or combinations thereof. Server device 102 and user device 112 may communicate through network 100. For example, user device 112 may be configured to send and/or receive messages such as phone calls, text messages, push notifications, emails, etc. including, in some cases, sending and/or receiving messages to and/or from server device 102. As described in detail below, user device 112 may have a financial application installed thereon, which may provide access to one or more user accounts (e.g., bank accounts, credit card accounts, etc.) through network 100.

Server device 102 may be configured to determine whether users are affected by natural disasters or other events and respond by performing actions that may secure the users' accounts. Server device 102 may include account service 104, which may be configured to identify an area 110 affected by such an event, identify users and/or user devices 112 associated with area 110, and perform processing to secure users' identities and/or accounts (e.g., accounts accessible through the financial application) as described in detail below. Server device 102 may include account database 106, which may be configured to store information about area 110 and/or about users' accounts and/or user devices 112 as described in detail below.

A single server device 102 and user device 112 are depicted for ease of illustration, but those of ordinary skill in the art will appreciate that server device 102 and/or user device 112 may be embodied in different forms for different implementations. For example, server device 102 may include a plurality of servers. In other examples, server device 102 may include multiple account services 104 and/or account databases 106. Moreover, any number of user devices 112 may be in communication with network 100 and/or may be inside or outside area 110. In some cases, a single user may log onto an account using multiple user devices 112 and/or a single user device 112 may be shared by multiple users with separate accounts.

Figure 2:
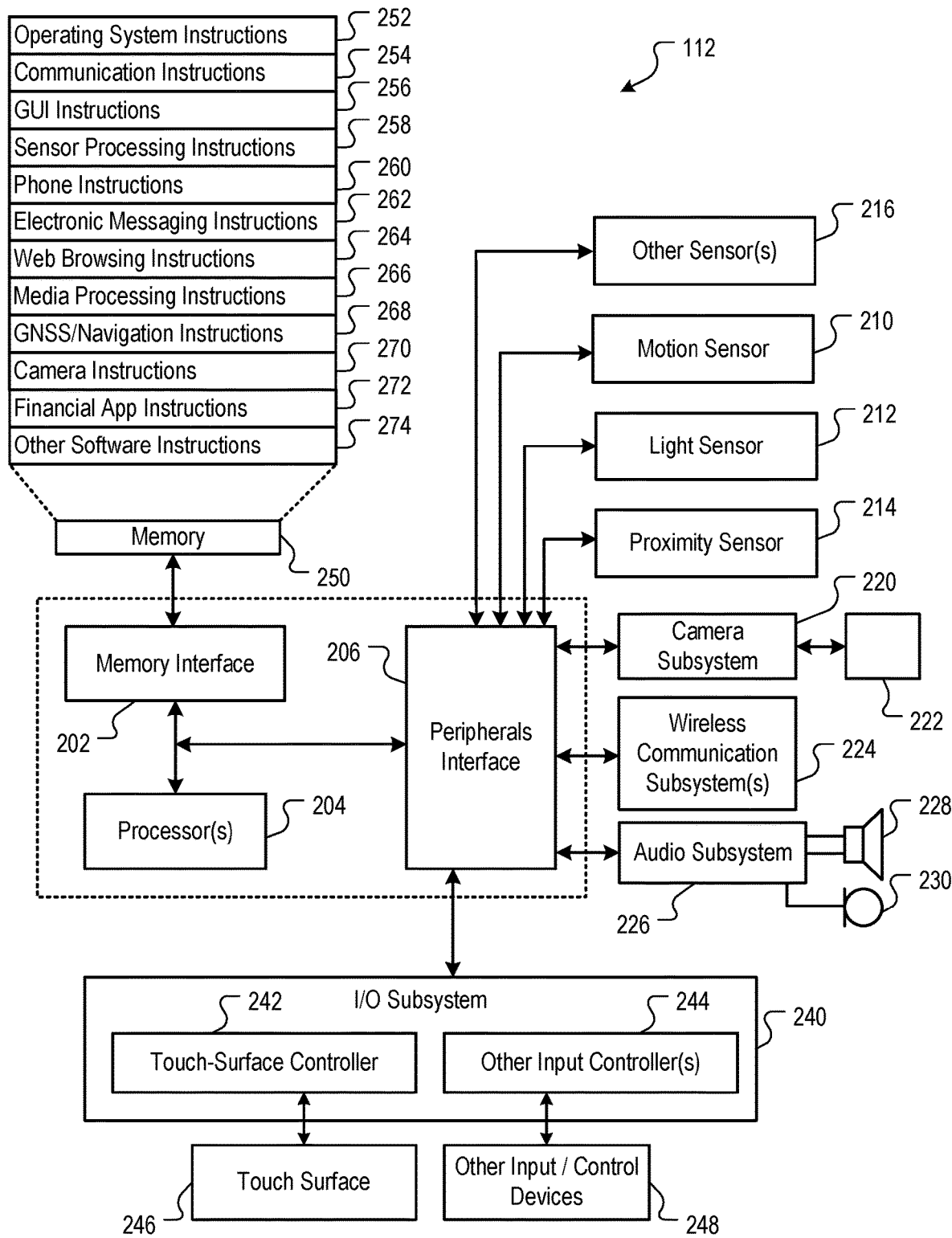
FIG. 2 shows a client device according to an embodiment of the present disclosure.

FIG. 2 shows a block diagram of an example computing device, for example a computing device configured to function as user device 112. For example, user device 112 may interact with server device 102 as described herein. The user device 112 may include a memory interface 202, one or more data processors, image processors, central processing units 204, and a peripherals interface 206. The memory interface 202, the one or more processors 204, and/or the peripherals interface 206 may be separate components or may be integrated in one or more integrated circuits. The various components in the user device 112 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wired and/or wireless communication subsystems 224, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 224. The specific design and implementation of the communication subsystems 224 may depend on the communication network(s) over which the user device 112 is intended to operate. For example, the user device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that the device 120 can be configured as a base station for other wireless devices and/or to provide a WiFi service.

An audio subsystem 226 may be coupled to a speaker 228 and a microphone 230 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to the user device 112 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, the user device 112 may present recorded audio and/or video files, such as MP3, AAC, and MPEG files. In some implementations, the user device 112 may include the functionality of an MP3 player, such as an iPod™. The user device 112 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store financial application instructions 272 to facilitate other processes and functions, such as communicating with server device 102 for account management and/or protection as described herein.

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of the user device 112 may be implemented in hardware and/or in software, including in one or more signal processing and/or application specific integrated circuits.

Figure 3:
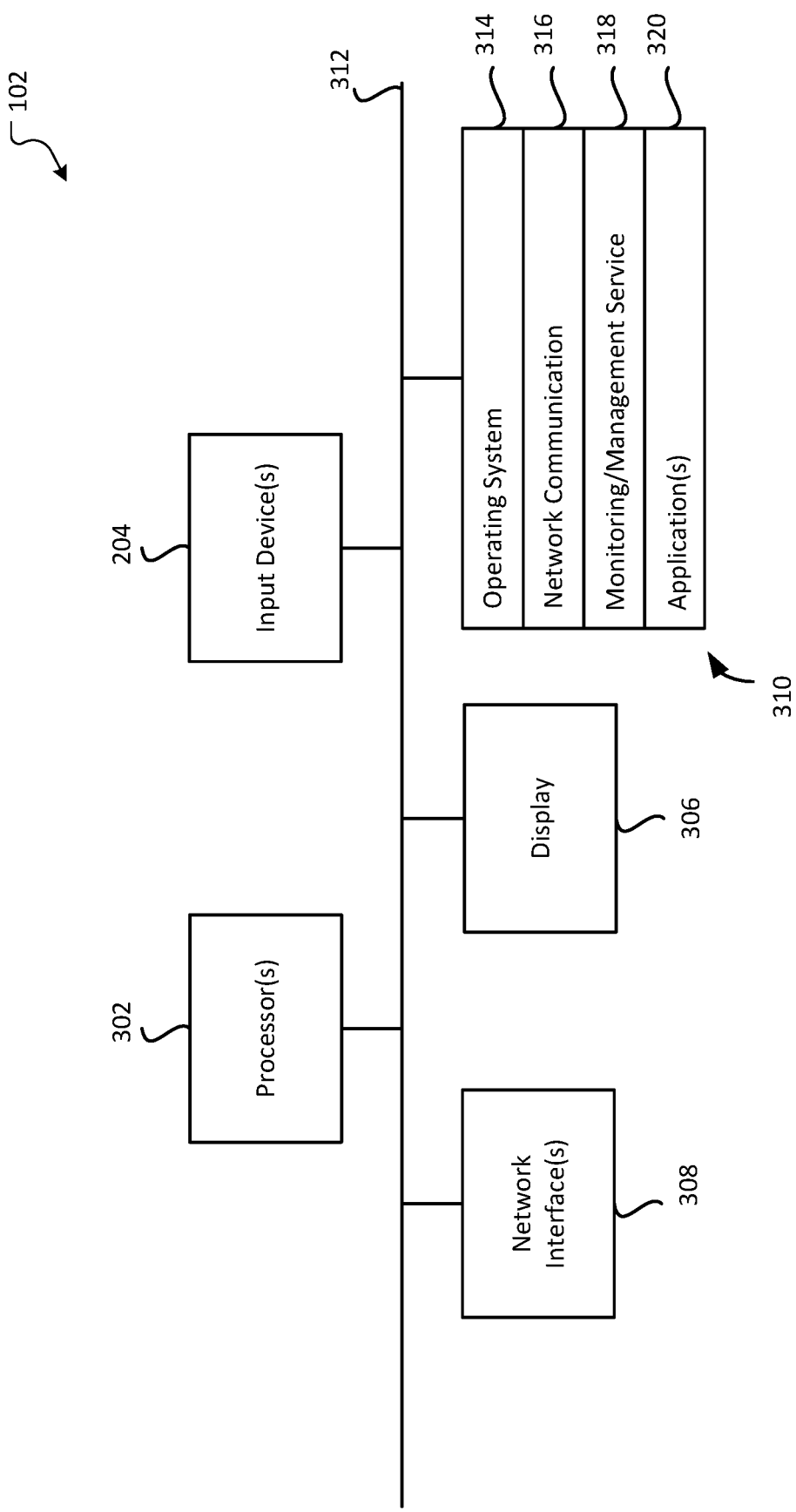
FIG. 3 shows a server device according to an embodiment of the present disclosure.

FIG. 3 is a block diagram of an example server device 102 that may implement various features and processes as described herein. The server device 102 may be implemented on any electronic device that runs software applications derived from compiled instructions, including without limitation personal computers, servers, smart phones, media players, electronic tablets, game consoles, email devices, etc. In some implementations, the server device 102 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Monitoring/management service instructions 318 can include instructions that identify potentially vulnerable users and take steps to protect accounts of identified users as described herein. Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4:
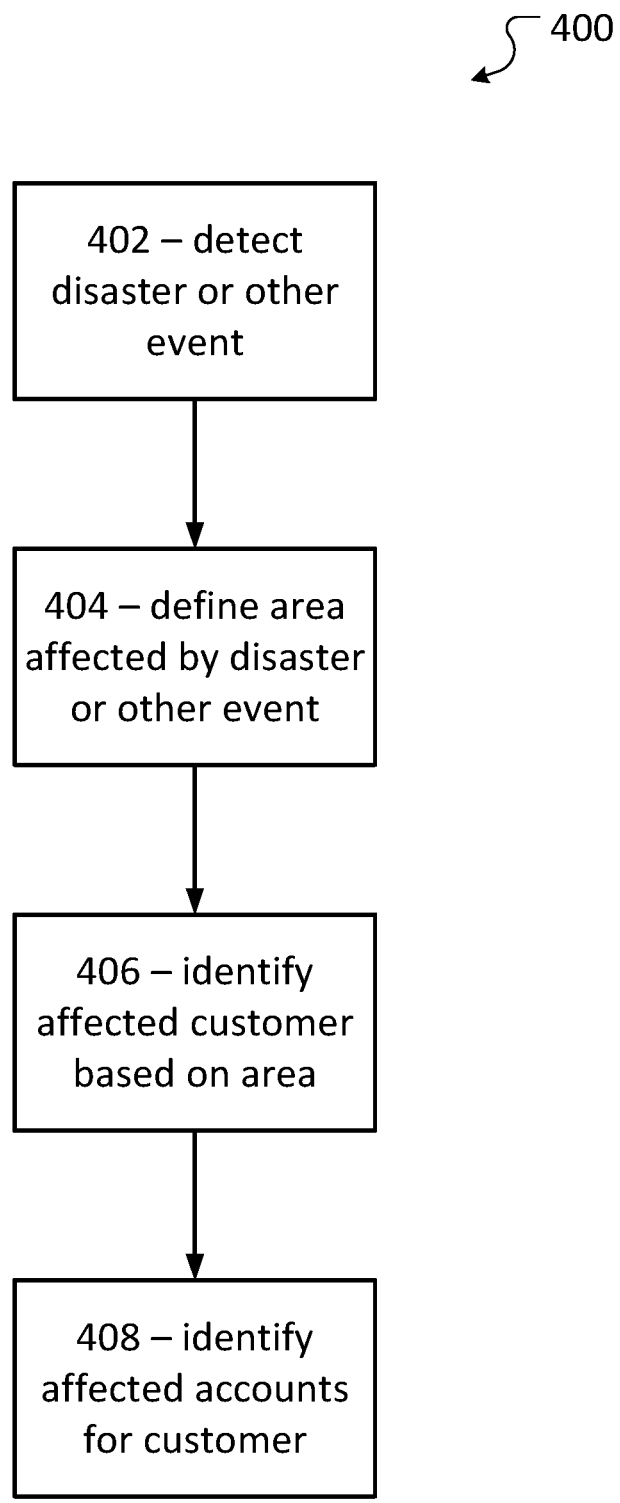
FIG. 4 shows a user identification process according to an embodiment of the present disclosure.

FIG. 4 shows a user identification process 400 according to an embodiment of the present disclosure. Server device 102 may perform process 400 to identify accounts that may require and/or benefit from account protection measures (e.g., as described below with respect to FIG. 5).

At 402, server device 102 may detect a disaster or other event. For example, account service 104 may be configured to monitor one or more data sources that report on disasters or other events. Account service 104 may monitor sources such as weather reporting data feeds, news feeds, and/or other data sources that may be known in the art and/or that may otherwise exist. In some cases, one or more monitored sources may report an event, and the report may include data that may indicate the event is a disaster to which account service 104 may respond. For example, weather data may include indications of tornado warnings/sightings/events, hurricane warnings/sightings/events, flood warnings/sightings/events, tsunami warnings/sightings/events, wildfire warnings/sightings/events, etc. Other sources, such as United States Geological Survey (USGS) reporting, may include indications of earthquakes, volcanos, etc. Other types of events, such as widespread crime events, acts of terrorism, acts of war, etc. may be reported upon and detected by account service 104 as well in some embodiments. In some cases, account service 104 may be able to detect events directly from the data feeds provided by the data sources (e.g., weather feeds), and in other cases, account service 104 may perform natural language processing and/or other analysis on the data (e.g., from news feeds) to detect the events. In some embodiments, account service 104 may require two or more sources to report an event before proceeding with process 400.

At 404, server device 102 may define area 110 affected by the event detected at 102. For example, account service 104 may define a geofence surrounding area 110. To define the geofence, account service 104 may extract location data from the event data gathered at 402. For example, weather reports and other data sources may define affected locations (e.g., counties, cities, zip codes, etc.). In some embodiments, account service 104 may configure a geofence around the perimeter of an affected location or combination of affected locations and thereby define area 110. In some embodiments, account service 104 may define a central point for the event and may define the area using a radius from the central point. For example, for localized events such as shootings or other crimes and/or acts of terrorism, the event may have occurred at a single location, and the affected area may be a radius from the location (e.g., a half-mile radius, mile radius, etc., depending on the type of event in some embodiments).

At 406, server device 102 may identify one or more customers that may be affected by the event detected at 102. For example, account service 104 may identify affected customers based on their presence or likely presence within geofenced area 110. Account service 104 may use one or more data points about customers to determine whether they are within or likely within geofenced area 110. For example, account service 104 may examine account data for customer accounts in account database 106. Account service 104 may identify all customers listed in account database 106 as having home or work addresses within geofenced area 110, all customers listed in account database 106 as having area codes within geofenced area 110, and/or all customers listed in account database 106 with frequent and/or recent transactions occurring within geofenced area 110. In some embodiments, account service 104 may communicate with user devices 112 to determine whether user devices 112 are within geofenced area 110 (e.g., the financial application of user device 112 may report user device 112 location based on GPS and/or other navigation or location features available on user device 112). In some embodiments, account service 104 may identify customers as being within geofenced area 110 based on most recent interactions with the customers being within geofenced area 110, for example due to a most recent IP address used by user device 112 to interact with an account server originating within geofenced area 110 and/or due to a most recent ATM transaction by the customer being within geofenced area 110.

At 408, server device 102 may identify accounts held by the user(s) identified at 406. For example, users may be account holders appearing in account database 106 and/or using a financial application at user device 112, but in some cases, users may have more than one account, or accounts may have multiple users. Accordingly, account service 104 may confirm that all accounts of all affected users have been identified for protection processing (e.g., as performed according to FIG. 5, described below).

Figure 5:
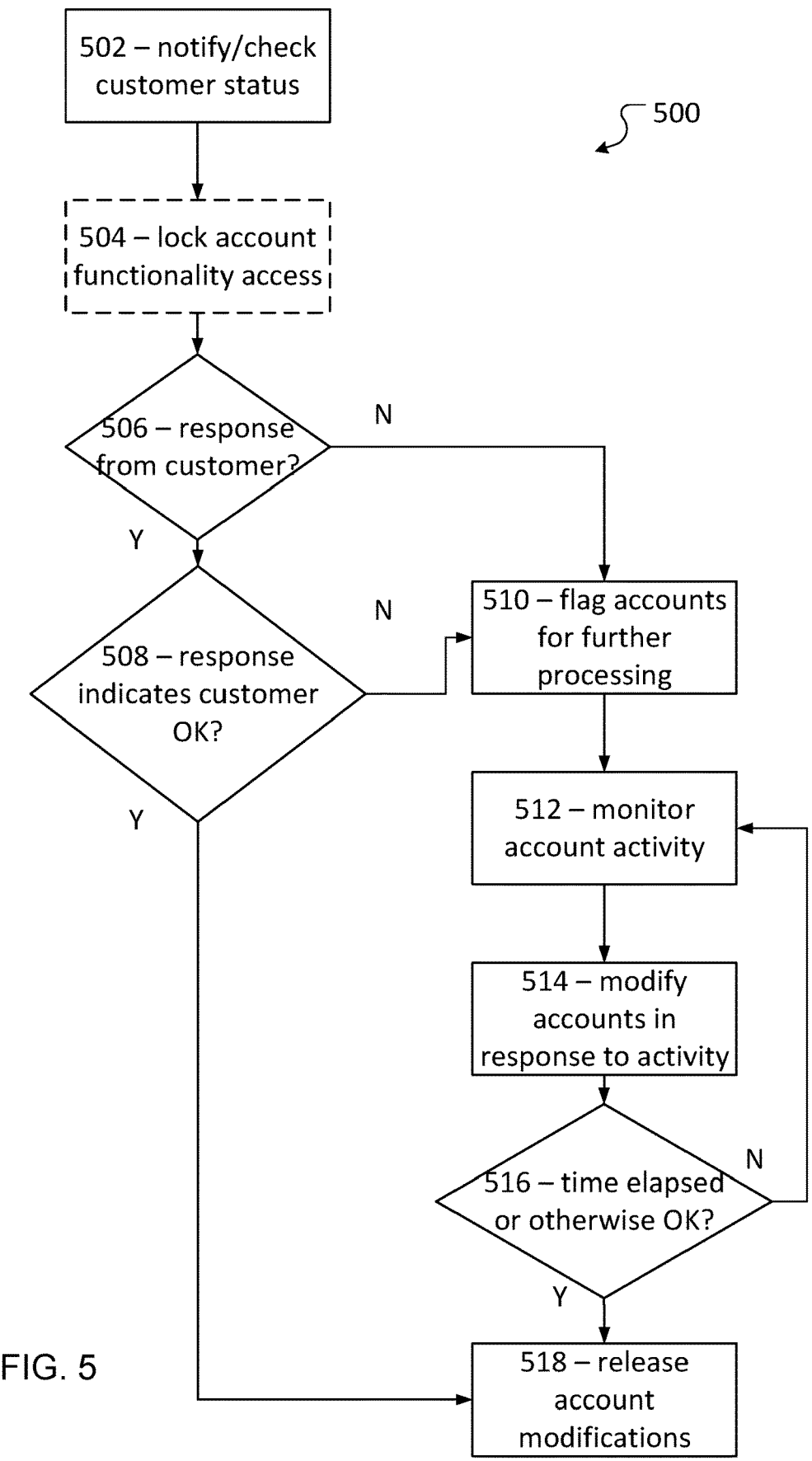
FIG. 5 shows an account protection process according to an embodiment of the present disclosure.

FIG. 5 shows an account protection process according to an embodiment of the present disclosure. Server device 102 may perform process 500 to protect accounts that may require and/or benefit from account protection measures (e.g., as identified above in process 400 of FIG. 4).

At 502, server device 102 may attempt to notify the customer and/or otherwise determine a status of the customer. For example, account service 104 may send one or more messages to user device 112. The messages may inform the customer of the event and may prompt for a response. For example, a message may describe the event and ask the customer to confirm they are safe and/or to confirm their account(s) and/or other data are safe. Account service 104 may send the message(s) to user device 112 through network 100 in a variety of ways, such as by email, SMS/MMS message, push notification, in-app communication, phone call (automated and/or by live representative), etc. In some embodiments, the customer may have designated one or more emergency contacts (e.g., within account settings), and account service 104 may send message(s) to a user device associated with the emergency contact(s) in addition to or instead of user device 112.

At 504, server device 102 may lock account access and/or use. In some embodiments, account service 104 may pre-emptively lock account access and/or use upon determination that the account is within geofenced area 110. Account service 104 may lock account access and/or use before receiving a response to the message(s) sent at 502, for example, as a precautionary measure in case the customer cannot respond. In other embodiments, server device 102 may wait for a customer response before taking any account action, in which case 504 may be skipped. In some embodiments, locking account access and/or use may be a total lock of all account activity. In other embodiments, the locking may restrict only a subset of account activity, such as card not present transactions, major account changes (e.g., adding authorized users), charges over a predetermined value, charges exceeding a temporary account credit limit less than a true account credit limit, etc.

At 506, server device 102 may receive a response from the customer or a predetermined amount of time may elapse with no response received. The response may be one of a plurality of available responses provided in the message(s) in some embodiments. For example, the customer may be able to select a response indicating they are safe and their data is safe, a response indicating they are safe but they are unsure whether their data is safe, or a response indicating they are not safe. In some embodiments, the customer may be prompted to authenticate using one or more biometrics, such as touch ID and/or facial recognition, in order to provide an indication that the response is truly coming from the customer. In some embodiments, the customer may be able to link a credit or debit card having near field communication technology to user device 112, and the response may indicate that the credit card is in the vicinity of the responding user device 112 (e.g., indicating that the customer has possession of the card). In some embodiments, the customer may be able to photograph a credit or debit card with a camera of user device 112, and the response may include the photograph (e.g., indicating that the customer has possession of the card). In some embodiments, the customer may be able to indicate which accounts are safe and which are not in the response (e.g., I have my credit card, but I do not have my debit card).

If the response indicates that everything is OK (e.g., customer is safe and account data is safe) at 508, then, at 518, server device 102 may leave the safe account(s) unaffected. If an account was preemptively locked at 504, then account service 104 may unlock the account. In some cases, the customer may indicate only a subset of accounts is safe (e.g., I have my credit card, but I do not have my debit card). In this case, account service 104 may leave unaffected or unlock the safe account(s) but process the unsafe account(s) as described below.

At 510, if the response indicates that at least one account is not safe, server device 102 may flag unsafe accounts for further processing. For example, account service 104 may mark each unsafe account with a flag that may include a time stamp indicating when the account was deemed unsafe. In some embodiments, account service 104 may select one or more of a plurality of flags with which to label an account. For example, account service 104 may mark an account as being locked, as requiring heightened scrutiny of transactions, as requiring notification to outside entities (e.g., credit bureaus), as being unable to add new accounts or make account setting changes, as requiring issuance of replacement card(s), etc. In some cases, a flag may require multi-factor authentication for future account logins. In some cases, a flag may require account changes to be made in person, rather than through user device 112. Other flags may require other restrictions listed above (e.g., restricting card not present transactions, major account changes (e.g., adding authorized users), charges over a predetermined value, charges exceeding a temporary account credit limit less than a true account credit limit, etc.). Account service 104 may apply flags based on account type and/or response type. For example, account service 104 may be configured to always lock certain types of accounts, or always require heightened scrutiny for some types of accounts, etc. Account service 104 may be configured to examine responses received at 506 to determine how to handle accounts in some cases; for example when a response indicates a card is lost, account service 104 may flag the account for sending a replacement card. An account may have more than one flag applied in some embodiments (e.g., lock, scrutiny, and modification restriction may each be selected, and may be later removed together or at different times as described below). In some embodiments and/or for some kinds of flags, account service 104 may notify the customer of the changes to their accounts and/or account access (e.g., by messaging user device 112 as described above).

At 512, server device 102 may monitor account activity of flagged accounts. For example, account service 104 may monitor transactions and/or transaction attempts, account accesses and/or access attempts, etc. Account service 104 may monitor for activities that violate flags set at 510 and/or that may otherwise indicate likely customer behavior or likely fraudulent behavior.

At 514, server device 102 may respond to activity (or a lack thereof) monitored at 512. For example, account service 104 may trigger alerts for transactions that may be suspicious. In a specific, non-limiting example, account service 104 may detect a non-card present transaction that is non-recurring at 512. In response, account service 104 may reach out to the customer (e.g., by sending a message to user device 112 in a similar manner as described above) to confirm whether the transaction and/or the account should still be enabled. This type of transaction may provide evidence that the customer is alive and active. On the other hand, if the transaction is not performed by the customer, it may be evidence that the account has been compromised. Account service 104 may ask whether the transaction is fraud and/or may assume fraud and not unlock the account until the customer verifies the transaction. In some respects, the monitoring and response may be similar to standard account monitoring, but with a higher level of transaction scrutiny during the event (e.g., more transactions may be targeted for verification than may normally be targeted). Account service 104 may be able to take a variety of actions in response to a variety of activities. For example, account service 104 may be able to apply multiple levels of scrutiny (e.g., a lower level for transactions and a higher level for account modification/creation). Account service 104 may perform standard monitoring for card-present transactions within a radius of the customer's home and higher-scrutiny monitoring for card-present transactions outside the radius. Account service 104 may also be able to enhance the customer's account access, for example adjusting ATM limits upwards within a radius, or at previously used ATMs, to give greater access to cash while other accounts are limited due to freeze (e.g., because ATM transactions may be harder to spoof due to the use of a physical card and PIN). Also, account service 104 may adjust the flags over time. For example, as verified, non-fraudulent transactions occur, enhanced monitoring flags may be removed. As a user confirms they are OK, account locks may be removed. In other embodiments, other actions may be taken during the predetermined period after the event, depending on system 100 and/or user requirements.

Server device 102 may continue to monitor and/or respond to account activity for a period of time after the event takes place or until an account is deemed secure. At 516, if the period of time has not elapsed and the account is not deemed secure, account service 104 may repeat the processing of 512 and 514. Otherwise, after a predetermined amount of time has passed or activity at 512 and 514 has indicated that flags may be removed, account service 104 may discontinue monitoring and/or responding under the heightened scrutiny of process 500 (e.g., ordinary account monitoring may continue to be performed for some accounts in some embodiments, but this may be separate from the monitoring of process 500). For example, activity that may indicate that the account may be secure may include a user performing a step up authentication (e.g., through online interaction with their account), a user visiting an ATM or physical bank branch, a user calling a customer service representative, or other configurable settings which may indicate the account may be returned to normal. At 518, server device 102 may release any remaining flags in response to a determination at 516 that a time associated with the event has lapsed and/or the account is otherwise deemed to be secure.

In some embodiments, time periods associated with releasing flags may vary depending on the flag. For example, if the flag is intrusive to the customer (e.g., they can't make a large purchase), then it may be removed in a matter of days. If the flag requires additional monitoring for fraud, then it may stay on for months or even a year or more. As another example, heightened security checks for things the customer does infrequently (e.g., adding an authorized user) may stay on for a year or so. Some of the flags may also be proactively removed when the user does something. For example, if the customer changes their authentication credentials, one or more flags may be removed, especially if the customer authenticates using biometrics when performing that action.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of modifying access of a device associated with a user to electronic financial transaction functionality in response to an event, comprising:
    determining, by a server, an area affected by the event;
    configuring, by the server, a geofence defining the area;
    identifying, by the server within the area, an account providing access to electronic financial transaction functionality, the identifying including identifying a match between a location within the geofence defining the area and at least one of a detected location of the device associated with the user, an address associated with the account, and a last known interaction between the user and a location servicing the account;
    determining, by the server, that a status of at least one of the user, the device associated with the user, and data associated with the user is potentially insecure due to the match;
    after determining that the status of at least one of the user, the device associated with the user, and the data associated with the user is potentially insecure, identifying, by the server, a pending transaction attempt by the device associated with the user, the pending transaction attempt requiring access by the device associated with the user to the electronic financial transaction functionality at the server;
    in response to the determining that the status of at least one of the user, the device associated with the user, and the data associated with the user is potentially insecure, requesting, by the server, authentication of the user and confirmation of the pending transaction from the device associated with the user through a network;
    receiving, by the server, data authenticating the user and the confirmation from the device associated with the user through the network; and
    in response to receiving the confirmation, permitting, by the server, the pending transaction to be processed, the permitting comprising enabling electronic financial transaction functionality for the account at the server that is accessible to the device associated with the user.

2. The method of claim 1, further comprising in response to the determining that the status of at least one of the user, the device associated with the user, and the data associated with the user is potentially insecure, restricting, by the server, access of the device associated with the user to the electronic financial transaction functionality at the server through the network.

3. The method of claim 2, further comprising:
    determining, by the server, that the status of at least one of the user, the device associated with the user, and the data associated with the user is no longer potentially insecure; and
    restoring, by the server, the access of the device associated with the user to the electronic financial transaction functionality to a status prior to the restricting in response to the determining that the status of the user is no longer potentially insecure.

4. The method of claim 1, wherein the determining, by the server, that the status of at least one of the user, the device associated with the user, and the data associated with the user is potentially insecure comprises sending, by the server, a message to the device associated with the user and at least one of:
    failing, by the server, to detect a response from the device associated with the user before a first time from the sending; and
    receiving, by the server, a response from the device associated with the user indicating that at least one of the user, the device associated with the user, and the data associated with the user is insecure.

5. The method of claim 4, wherein:
    the response from the device indicates that at least one of the user, the device associated with the user, and the data associated with the user is insecure includes an incorrect identity authentication; and
    the determining, by the server, that the status of at least one of the user, the device associated with the user, and data associated with the user is potentially insecure due to the match is based on the incorrect identity authentication.

6. The method of claim 4, wherein:
    the response from the device indicates that at least one of the user, the device associated with the user, and the data associated with the user is insecure includes evidence that the user does not have the physical card in their possession; and
    the determining, by the server, that the status of at least one of the user, the device associated with the user, and data associated with the user is potentially insecure due to the match is based on the evidence that the user does not have the physical card in their possession.

7. The method of claim 1, further comprising locking, by the server, access to the electronic financial transaction functionality after the identifying of the account and before the determining that the status of at least one of the user, the device associated with the user, and the data associated with the user is potentially insecure.

8. The method of claim 1, wherein the requesting includes:
    raising, by the server, a level of scrutiny for the pending transaction in response to the determining that the status of at least one of the user, the device associated with the user, and the data associated with the user is potentially insecure; and triggering, by the server, the requesting in response to the level of scrutiny exceeding a threshold in response to the raising.

9. A server configured to modify account for modifying access of a device associated with a user to electronic financial transaction functionality in response to an event, comprising:
  a transceiver configured to communicate with a device associated with a user;
  a processor in communication with the transceiver; and
  a non-transitory memory in communication with the processor and configured to store instructions that, when executed by the processor, cause the processor to perform processing comprising:
    determining an area affected by the event;
    configuring a geofence defining the area;
    identifying, within the area, an account providing access to electronic financial transaction functionality, the identifying including identifying a match between a location within the geofence defining the area and at least one of a detected location of the device associated with the user, an address associated with the account, and a last known interaction between the user and a location servicing the account;
    determining that a status of at least one of the user, the device associated with the user, and data associated with the user is potentially insecure due to the match;
    after determining that the status of at least one of the user, the device associated with the user, and the data associated with the user is potentially insecure, identifying a pending transaction attempt by the device associated with the user, the pending transaction attempt requiring access by the device associated with the user to the electronic financial transaction functionality at the server;
    in response to the determining that the status of at least one of the user, the device associated with the user, and the data associated with the user is potentially insecure, requesting authentication of the user and confirmation of the pending transaction from the device associated with the user through a network;
    receiving data authenticating the user and the confirmation from the device associated with the user through the network; and
    in response to receiving the confirmation, permitting the pending transaction to be processed, the permitting comprising enabling electronic financial transaction functionality for the account at the server that is accessible to the device associated with the user.

10. The server of claim 9, wherein the non-transitory memory in communication with the processor is further configured to store instructions that, when executed by the processor, cause the processor to further perform processing comprising restricting access of the device associated with the user to the electronic financial transaction functionality at the server through the network in response to the determining that the status of at least one of the user, the device associated with the user, and the data associated with the user is potentially insecure.

11. The server of claim 10, wherein the non-transitory memory in communication with the processor is further configured to store instructions that, when executed by the processor, cause the processor to further perform processing comprising:
    determining that the status of at least one of the user, the device associated with the user, and the data associated with the user is no longer potentially insecure; and
    restoring the access of the device associated with the user to the electronic financial transaction functionality to a status prior to the restricting in response to the determining that the status of the user is no longer potentially insecure.

12. The server of claim 9, wherein the determining that the status of at least one of the user, the device associated with the user, and the data associated with the user is potentially insecure comprises sending a message to the device associated with the user and at least one of:
    failing to detect a response from the device associated with the user before a first time from the sending; and
    receiving a response from the device associated with the user indicating that at least one of the user, the device associated with the user, and the data associated with the user is insecure.

13. The server of claim 12, wherein:
  the response from the device indicates that at least one of the user, the device associated with the user, and the data associated with the user is insecure includes an incorrect identity authentication; and
  the determining that the status of at least one of the user, the device associated with the user, and data associated with the user is potentially insecure due to the match is based on the incorrect identity authentication.

14. The server of claim 12, wherein:
  the response from the device indicates that at least one of the user, the device associated with the user, and the data associated with the user is insecure includes evidence that the user does not have the physical card in their possession; and
  the determining that the status of at least one of the user, the device associated with the user, and data associated with the user is potentially insecure due to the match is based on the evidence that the user does not have the physical card in their possession.

15. The server of claim 9, wherein the non-transitory memory in communication with the processor is further configured to store instructions that, when executed by the processor, cause the processor to further perform processing comprising locking access to the electronic financial transaction functionality after the identifying of the account and before the determining that the status of at least one of the user, the device associated with the user, and the data associated with the user is potentially insecure.

16. The server of claim 9, wherein the requesting includes:
    raising a level of scrutiny for the pending transaction in response to the determining that the status of at least one of the user, the device associated with the user, and the data associated with the user is potentially insecure; and
    triggering the requesting in response to the level of scrutiny exceeding a threshold in response to the raising.

* * * * *